(12) United States Patent  (10) Patent No.: US 7,518,494 B2
Forster  (45) Date of Patent: *Apr. 14, 2009

(54) VEHICLE TAG READER

(76) Inventor: Ian J Forster, 31 Great Cobb, Chelmsford (GB) CM1 6LA ( * ) Notice: Subject to any disclaimer, the term of this patent is extended or adjusted under 35 U.S.C. 154(b) by 70 days.

This patent is subject to a terminal disclaimer.

(21) Appl. No.: 11/514,748

(22) Filed: Aug. 31, 2006

(65) Prior Publication Data

US 2007/0013500 A1   Jan. 18, 2007

Related U.S. Application Data

(60) Continuation of application No. 11/385,225, filed on Mar. 20, 2006, which is a division of application No. 10/214,501, filed on Aug. 8, 2002, now Pat. No. 7,015,802.

(51) Int. Cl.
*B60C 23/02* (2006.01)

(52) U.S. Cl. .................. 340/442; 340/441; 340/443; 340/445; 340/447; 340/10.3; 340/505; 73/146.5; 73/146.8

(58) Field of Classification Search .............. 340/442, 340/441, 443, 445, 447, 505, 10.3; 73/146.5, 73/416.8, 146.8
See application file for complete search history.

(56) References Cited

U.S. PATENT DOCUMENTS

| | | | |
|---|---|---|---|
| 4,021,705 A | 5/1977 | Lichtblau | |
| 4,160,971 A | 7/1979 | Jones et al. | |
| 4,529,961 A | 7/1985 | Nishimura et al. | |
| 4,609,905 A * | 9/1986 | Uzzo | 340/447 |
| 4,816,802 A | 3/1989 | Doerksen et al. | |
| 5,032,823 A | 7/1991 | Bower et al. | |
| 5,181,423 A | 1/1993 | Philipps et al. | |
| 5,181,975 A | 1/1993 | Pollack et al. | |
| 5,218,861 A | 6/1993 | Brown et al. | |
| 5,319,354 A | 6/1994 | Myatt | |
| 5,347,280 A | 9/1994 | Schuermann | |
| 5,403,222 A | 4/1995 | Koenig et al. | |
| 5,463,374 A | 10/1995 | Mendez et al. | |
| 5,473,938 A | 12/1995 | Handfield et al. | |
| 5,479,171 A | 12/1995 | Schuermann | |
| 5,541,574 A | 7/1996 | Lowe et al. | |
| 5,562,787 A | 10/1996 | Koch et al. | |
| 5,661,651 A | 8/1997 | Geschke et al. | |
| 5,675,314 A | 10/1997 | Chaklader | |
| 5,731,516 A | 3/1998 | Handfield et al. | |

(Continued)

FOREIGN PATENT DOCUMENTS

EP   0832765 A2   4/1998

(Continued)

*Primary Examiner*—Tai T Nguyen
(74) *Attorney, Agent, or Firm*—Christensen O'Connor Johnson Kindness PLLC

(57) ABSTRACT

A tire sensor that communicates to a remote interrogator in one of two modes depending on the nature of the interrogation. The interrogator may be distributed throughout a vehicle if needed for design options. Further, the interrogator only interrogates the transponder when the interrogator has reason to believe that the transponder is in range of the interrogator. The interrogator and transponder may be configured to operate in different modes for communication during operation of the tire on a vehicle and during non-operation. The transponder may communicate tire condition information to the interrogator concerning environmental or other information sensed about the tire.

58 Claims, 10 Drawing Sheets

U.S. PATENT DOCUMENTS

| | | |
|---|---|---|
| 5,731,754 A | 3/1998 | Lee, Jr. et al. |
| 5,745,039 A | 4/1998 | Hof et al. |
| 5,844,130 A | 12/1998 | Hilgart et al. |
| 5,936,155 A | 8/1999 | Francois et al. |
| 5,939,977 A | 8/1999 | Monson |
| 5,969,239 A | 10/1999 | Tromeur et al. |
| 5,977,870 A | 11/1999 | Rensel et al. |
| 6,016,127 A | 1/2000 | Casiola et al. |
| 6,028,503 A | 2/2000 | Preishuberpflugl et al. |
| 6,043,746 A | 3/2000 | Sorrells |
| 6,062,072 A | 5/2000 | Mock et al. |
| 6,087,930 A | 7/2000 | Kulka et al. |
| 6,140,974 A | 10/2000 | Dalley |
| 6,169,480 B1 | 1/2001 | Uhl et al. |
| 6,208,244 B1 | 3/2001 | Wilson et al. |
| 6,232,875 B1 | 5/2001 | DeZorzi |
| 6,257,289 B1 | 7/2001 | Tomita et al. |
| 6,278,413 B1 | 8/2001 | Hugh et al. |
| 6,285,342 B1 | 9/2001 | Brady et al. |
| 6,304,172 B1 | 10/2001 | Katou et al. |
| 6,342,295 B1 | 1/2002 | Kobayashi |
| 6,350,791 B1 | 2/2002 | Feichtmeier et al. |
| 6,359,444 B1 | 3/2002 | Grimes |
| 6,362,731 B1 | 3/2002 | Lill |
| 6,368,707 B1 | 4/2002 | Kamiya et al. |
| 6,388,567 B1 | 5/2002 | Bohm et al. |
| 6,412,977 B1 | 7/2002 | Black et al. |
| 6,424,315 B1 | 7/2002 | Glenn et al. |
| 6,429,831 B2 | 8/2002 | Babb |
| 6,438,193 B1 | 8/2002 | Ko |
| 6,441,728 B1 * | 8/2002 | Dixit et al. ............ 340/447 |
| 6,463,798 B2 | 10/2002 | Neikerk et al. |
| 6,474,380 B1 | 11/2002 | Rensel et al. |
| 6,480,110 B2 | 11/2002 | Lee et al. |
| 6,483,473 B1 | 11/2002 | King et al. |
| 6,501,372 B2 | 12/2002 | Lin |
| 6,501,435 B1 | 12/2002 | King et al. |
| 6,518,876 B1 * | 2/2003 | Marguet et al. ......... 340/447 |
| 6,518,877 B1 | 2/2003 | Starkey et al. |
| 6,543,279 B1 | 4/2003 | Yones et al. |
| 6,571,617 B2 | 6/2003 | Van Niekerk et al. |
| 6,591,671 B2 | 7/2003 | Brown |
| 6,612,165 B2 | 9/2003 | Juzswik |
| 6,630,885 B2 | 10/2003 | Hardman et al. |
| 6,662,642 B2 | 12/2003 | Breed et al. |
| 6,748,797 B2 | 6/2004 | Breed |
| 6,791,457 B2 | 9/2004 | Shimura |
| 6,847,912 B2 | 1/2005 | Forster |
| 2001/0002451 A1 | 5/2001 | Breed |
| 2001/0008083 A1 | 7/2001 | Brown |
| 2002/0008632 A1 | 1/2002 | Clothier |
| 2004/0159158 A1 | 8/2004 | Forster |

FOREIGN PATENT DOCUMENTS

| | | |
|---|---|---|
| EP | 1 026 015 A2 | 8/2000 |
| EP | 1 187 346 A2 | 3/2002 |
| JP | 2000-255229 A | 9/2000 |
| JP | 2000255229 A | 9/2000 |
| WO | 0112453 A1 | 2/2001 |

* cited by examiner

VEHICLE TAG READER

FIELD OF THE INVENTION

The present invention relates to wireless communication devices associated with vehicle tires for the purposes of reporting tire conditions.

BACKGROUND OF THE INVENTION

As vehicles become more complex, vehicle designers change more and more parameters to modify performance and improve safety. One parameter that may be modified to change performance is the pressure within the tires of the vehicle. Unintended changes in the pressure within the tires of the vehicle may cause unwanted performance variations. These performance variations may include not only fuel consumption variations, but also safety concerns. Several efforts have been made to allow monitoring of the pressure in vehicle tires. In addition to merely monitoring the pressure in the tires, there is also a need to communicate the data from the monitoring to a location where the information may be used.

Because of the rotation of the tires, wire-based solutions to the communication issue are impractical. The pressure monitor is typically positioned on, and often inside, the tire itself such that the rotation of the tire precludes a wire-based communication link. Wireless solutions do offer many advantages and several systems have been proposed. In a typical solution, a transponder may be positioned within the vehicle and coupled to a pressure sensing device. An interrogator wirelessly queries the transponder and the transponder replies with information derived from the pressure sensor.

Because of differing vehicle designs, it is advantageous to have differing transponder designs. Having more transponder designs allows designers more options when integrating the transponders into vehicles and better designs may be the end result. To date, there has been a shortage of teachings in ways to distribute the interrogator within a vehicle. Likewise, how the transponder responds is a parameter of the sensing system that may be changed depending on the needs of the interrogator. Thus, providing a dual or multi-mode transponder may provide benefits to the designer.

SUMMARY OF THE INVENTION

The present invention relates to use of a wireless communication device on a tire for monitoring tire conditions and the reporting of these tire conditions using an interrogation device. Monitoring of tire conditions on a vehicle may be performed when the vehicle is in rest or in motion. Special considerations must be made when using an interrogation reader on a vehicle to detect tire conditions via a transponder or RFID associated with a tire. The transponder on the tire may not always be in range of the interrogation reader during the tire's rotation when the vehicle is in motion. Two aspects of the present invention are designed to give vehicle designers more options when using interrogators and transponders to monitor tire pressure in vehicles. The last aspect introduces additional functionality into the transponder.

A first aspect of the present invention involves distributing the interrogator throughout the vehicle in various configurations to give designers flexibility in laying out vehicle components. In a first embodiment, the interrogator is in the wheel well along with enough processing power to determine the tire pressure from the data received from the transponder. The output of the interrogator is sent to the vehicle control system for use thereby. Power is sent to the interrogator therefrom.

In a second embodiment, power is sent from the vehicle control system, and the interrogator sends back a baseband signal that the vehicle control system then processes to determine the pressure of the tire.

In a third embodiment, only an antenna is positioned in the wheel well. The modulated signal from the transponder is received and directed to the vehicle control system that performs all the processing.

A second aspect of the present invention relates to how the transponder associated with the tire is interrogated. Due to electromagnetic emission concerns, the interrogator may be relatively low powered. If, for example, the interrogator were positioned in the wheel well of the vehicle, the transponder might not respond when the transponder was in the bottom half of the tire's rotation. Thus, to secure a proper response, save power and time, or reduce emissions, it may be desirable to interrogate the transponder only when the transponder is in the top half or a portion of its rotation. This aspect of the present invention determines where the transponder is during the tire rotation, and then queries the transponder only when the transponder is proximate to the interrogator.

Exemplary techniques to determine the location of the transponder involve interfacing with the vehicle control system to learn the orientation of the wheel and empirically determining the location and interfacing with the vehicle control system to track its location with speed changes. Coupled with this aspect are some structural variations in the antenna structure designed to promote a more efficient communication between the transponder and the interrogator.

A third aspect of the present invention provides a dual mode transponder that responds in a different manner based on the type of interrogation signal received. In a first mode, the transponders operate in a contention access protocol and allow data downloads thereto in the event that the transponders have memory associated therewith. The contention-based access allows a single interrogator to address multiple transponders concurrently. The transponder may enter a second mode based on the type of signal that the transponder is receiving. In an exemplary embodiment, if the transponder enters an RF field for a predetermined period of time, but the RF field does not have an amplitude modulation (AM) data modulation scheme, the transponder transmits readings from its pressure sensor and a checksum as rapidly as possible for as long as the RF field is sufficient.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

In one aspect, embodiments of the invention may provide a number of options for designers of systems with moving objects, such as vehicles and tires. For example, in an effort to provide more information to a vehicle controller, tire pressure or other tire conditions may be sensed and reported through a wireless connection comprising a transponder and an interrogator. Embodiments of the present invention may include several variations of these elements for additional functionality and design opportunities when providing an interrogation system to interrogate conditions of moving objects, including but not limited to interrogating tire conditions on a vehicle.

Figure 1:
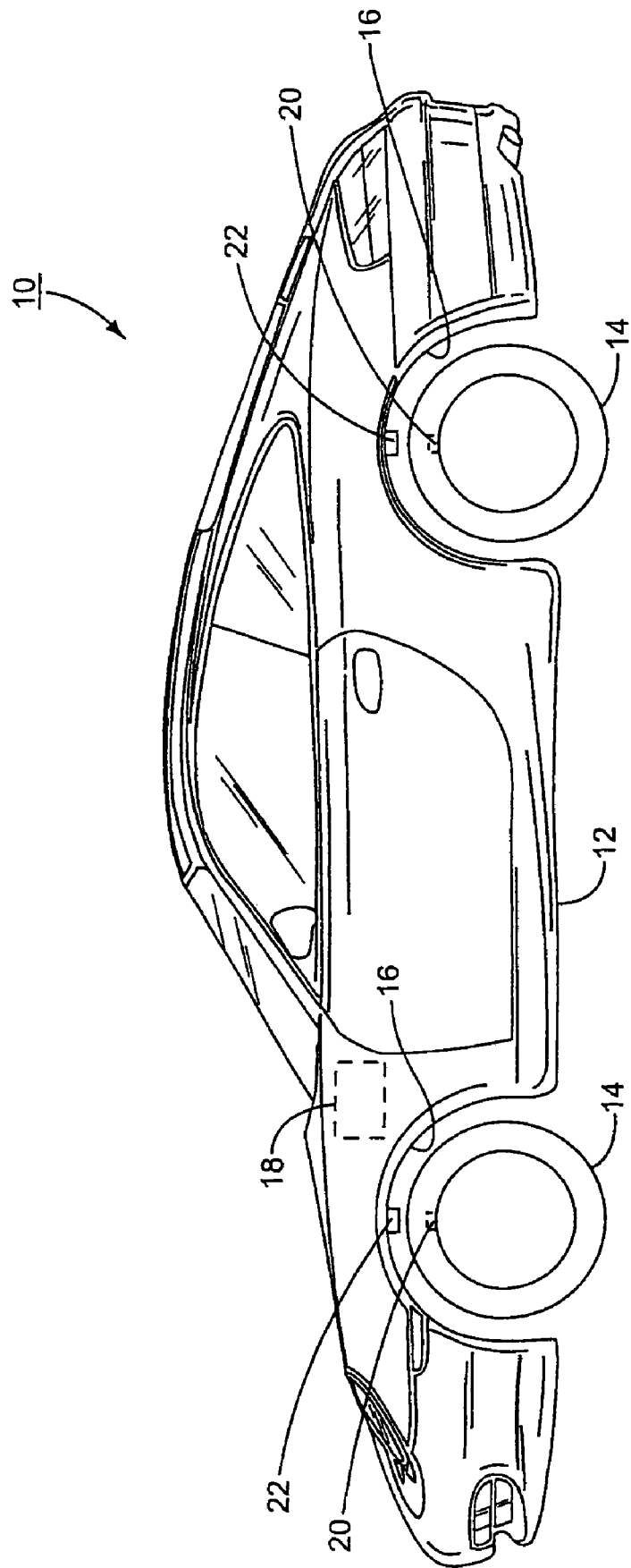
FIG. 1 illustrates a vehicle equipped with tires for pressure sensing according to an exemplary embodiment of the present invention.
Figure 2:
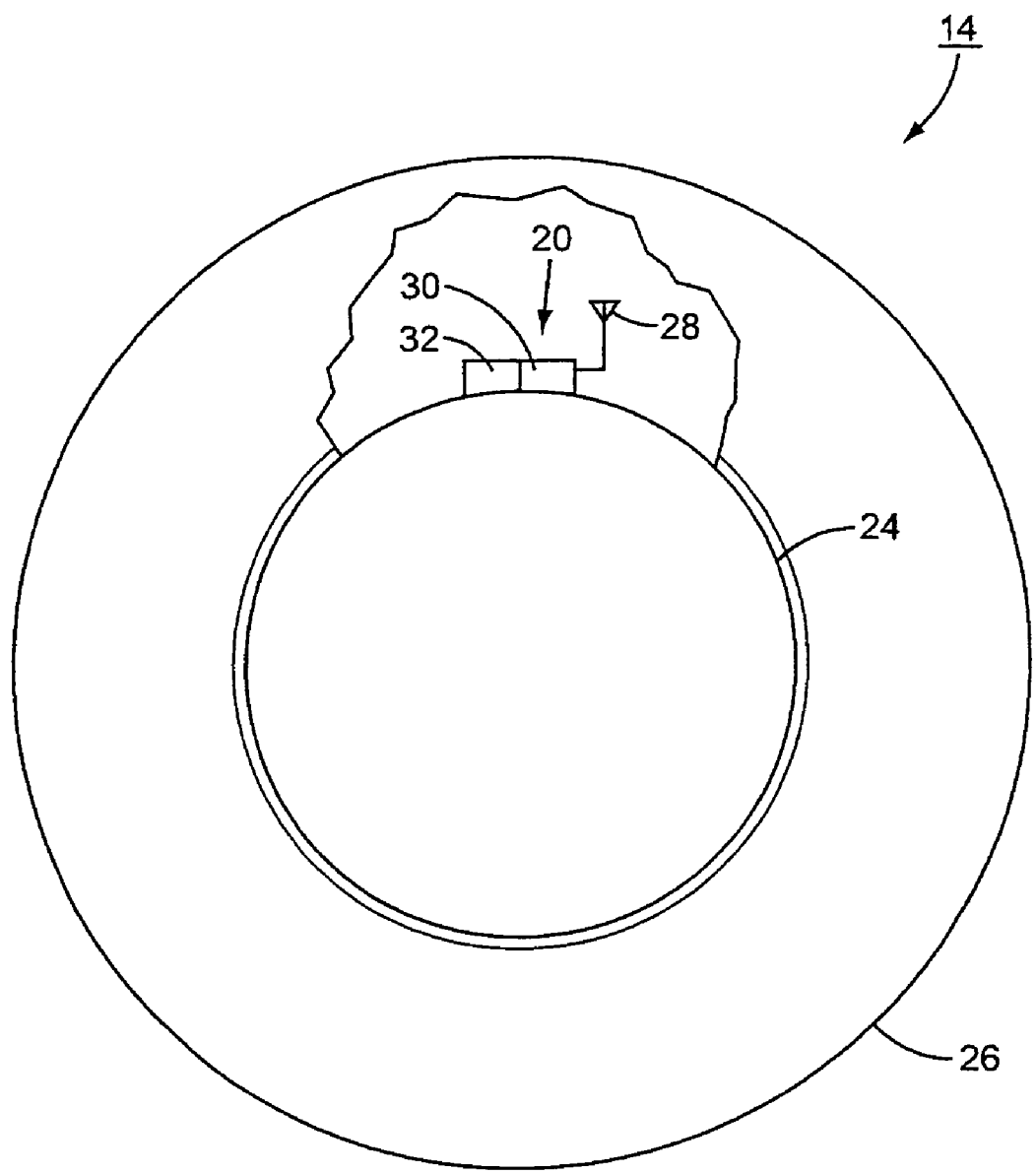
FIG. 2 illustrates a tire equipped with a transponder and a pressure sensing device according to an exemplary embodiment of the present invention.

FIG. 2 illustrates a more detailed view of a tire 14 with the associated transponder 20. The tire 14 may comprise a rim 24 and a tread element 26 as is well understood. Positioned within the tire 14 is the transponder 20, which may comprise an antenna 28 and a wireless communication circuit 30. A tire condition sensor 32 may be associated with the transponder 20. The tire condition sensor 32 may be a pressure sensor, a temperature sensor, humidity sensor, tread sensor, or any other type of sensor that measures or detects an environmental condition relating to the tire 14 or a condition about the tire 14 itself. The wireless communication circuit 30 and the tire condition sensor 32 may be integrated into a single unit as needed or desired. Further information about the wireless communication circuit 30, the antenna 28, and the tire condition sensor 32 may be found in U.S. Pat. Nos. 5,181,423; 4,529,961; 5,473,938; 6,087,930; 5,977,870; 5,562,787; 5,463,374; 5,844,130; 5,541,574; and 4,160,971; and U.S. patent application Ser. No. 10/164,459, filed Jun. 6, 2002, entitled "Capacitive Pressure Sensor," published under U.S. Publication No. 2004/0159158, all of which are hereby incorporated by reference. In an exemplary embodiment, the wireless communication circuit 30 comprises ONETAG™ circuitry, as shown in U.S. Pat. No. 6,501,435, entitled "Wireless Communication Device and Method," or MICROINSERT™ circuitry, as shown in U.S. Pat. No. 6,483,473, entitled "Wireless Communication Device and Method," both of which are hereby incorporated by reference. These devices are generally compatible with the INTELLITAG interrogators sold by INTERMEC of 6001 36th Avenue West, Everett, Wash. 98203-9280. U.S. patent application No. 60/378,384 entitled "RFID Temperature Device and Method," which provides priority for U.S. Pat. No. 6,847,912, discloses a temperature sensor, which is incorporated herein by reference in its entirety. An example of a humidity sensor is disclosed in U.S. Pat. No. 6,342,295 entitled "Moisture Sensor," incorporated herein by reference in its entirety. An example of a tread sensor is disclosed in U.S. Pat. No. 6,028,503 entitled "System for the Detection of Tire Tread Separation," incorporated herein by reference in its entirety. Note that any type of sensor may be used as the tire condition sensor 32.

Figure 3C:
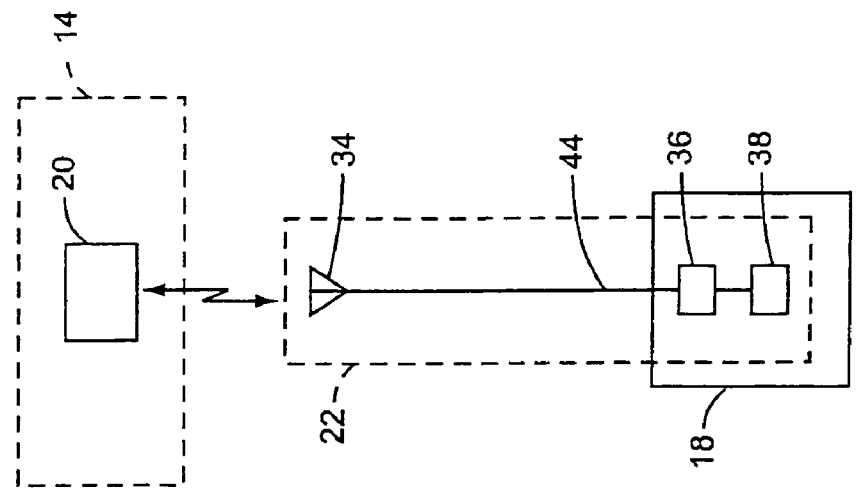
FIGS. 3A-3C illustrate three embodiments of a distributed interrogator according to one aspect of the present invention.
Figure 3B:
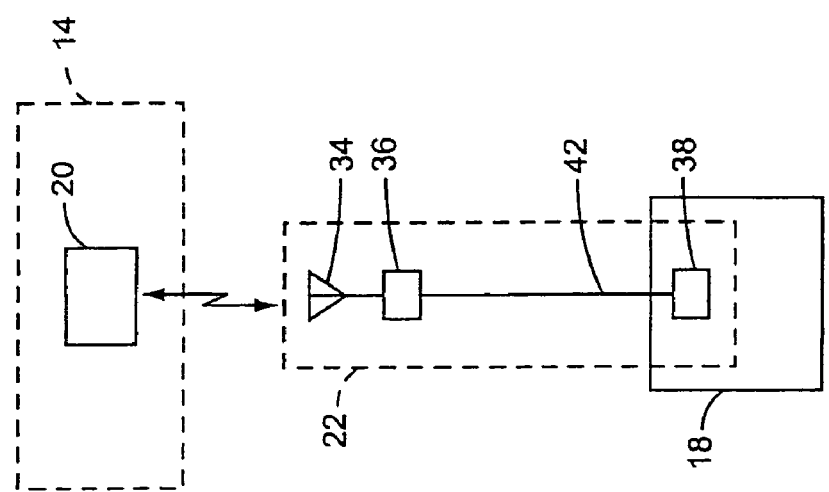
Figure 3A:
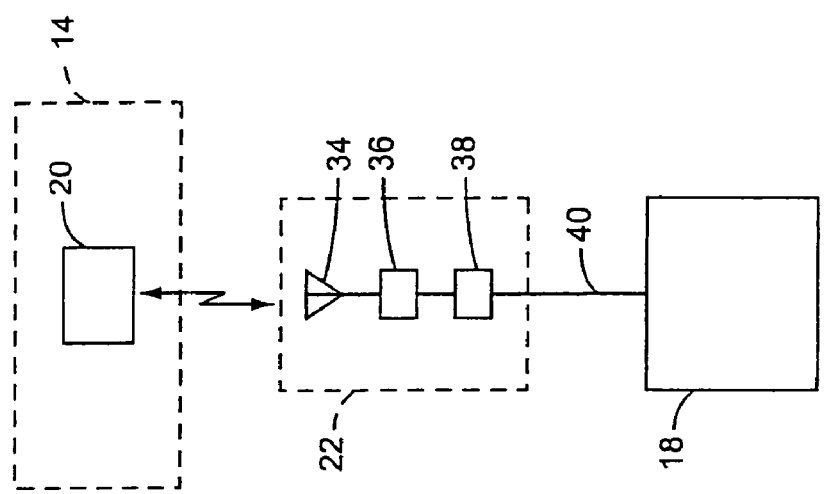

The interrogator 22 is schematically illustrated in FIGS. 3A-3C. An interrogator 22 may comprise an antenna 34, a demodulator 36, and a baseband processor 38. Further, filters, mixers, and the like may be present as is well understood. To provide additional design options for the designer of the vehicle 10, the interrogator 22 may be distributed in a number of different embodiments. As illustrated in FIG. 3A, the antenna 34, the demodulator 36, and the baseband processor 38 are all integrated into a single unit and positioned in a wheel well 16. Processed data and power flow to and from the vehicle controller 18 and the baseband processor 38 over the link 40.

FIG. 3B illustrates an embodiment, in which the baseband processor 38 is integrated into the vehicle controller 18, but the antenna 34 and the demodulator 36 are integrated into a single unit and positioned in the wheel well 16. The demodulated, but unprocessed signal and power are passed to and from the vehicle controller 18 and the demodulator 36 over the link 42.

FIG. 3C illustrates a third embodiment, in which the baseband processor 38 and the demodulator 36 are integrated into the vehicle controller 18. Only the antenna 34 is positioned in the wheel well 16. Raw, undemodulated signals and power pass to and from the antenna 34 and the baseband processor 38 over the link 44.

Together, these three embodiments provide a variety of options for designers to use when incorporating interrogators into vehicles. As noted earlier, provision of more options provides more flexibility for the designers and improves the likelihood that an acceptable design may be located that meets the design criteria of the designer. Note that these three embodiments do not match the INTERMEC device, but with the teachings of the present invention the components of the INTERMEC device could be split into such an arrangement by one of ordinary skill in the art.

With this background of hardware, some of the other aspects of the present invention may now be discussed. In the past, some systems have continuously interrogated the transponder 20 with the interrogator 22. This wastes power, and raises electromagnetic compatibility (EMC) issues, as well as FCC compliance issues. As vehicles become more complicated, with more circuitry associated therewith, the dangers of crosstalk and fugitive radio frequency (RF) emissions becomes more serious. Thus, the ability to interrogate selectively may give the designers more options in addressing these concerns. Selective interrogation may also prevent the interrogator 22 from erroneously interrogating transponders 20 that are positioned on nearby vehicles or transponders 20 positioned on other tires 14 of the vehicle 10. While all of these are concerns during the design phase, another concern is that of speed. Typically, the interrogator 22 must transmit initially a data sequence to initialize a reading from the tire condition sensor 32. This is followed by a reception of the data from the transponder 20. This query and response occupy a certain amount of time. If the transponder 20 is not in the field of view when the first byte of the initial data sequence is sent, the rest of the message is wasted, and the transponder 20 has to remain in the field of view until another message is sent, potentially doubling the amount of time needed and halving the vehicle speed at which the transponder 20 can be read. Accurate synchronization ensures that only one cycle of the protocol is needed to read the data, and this allows for maximum speed.

Figure 4:
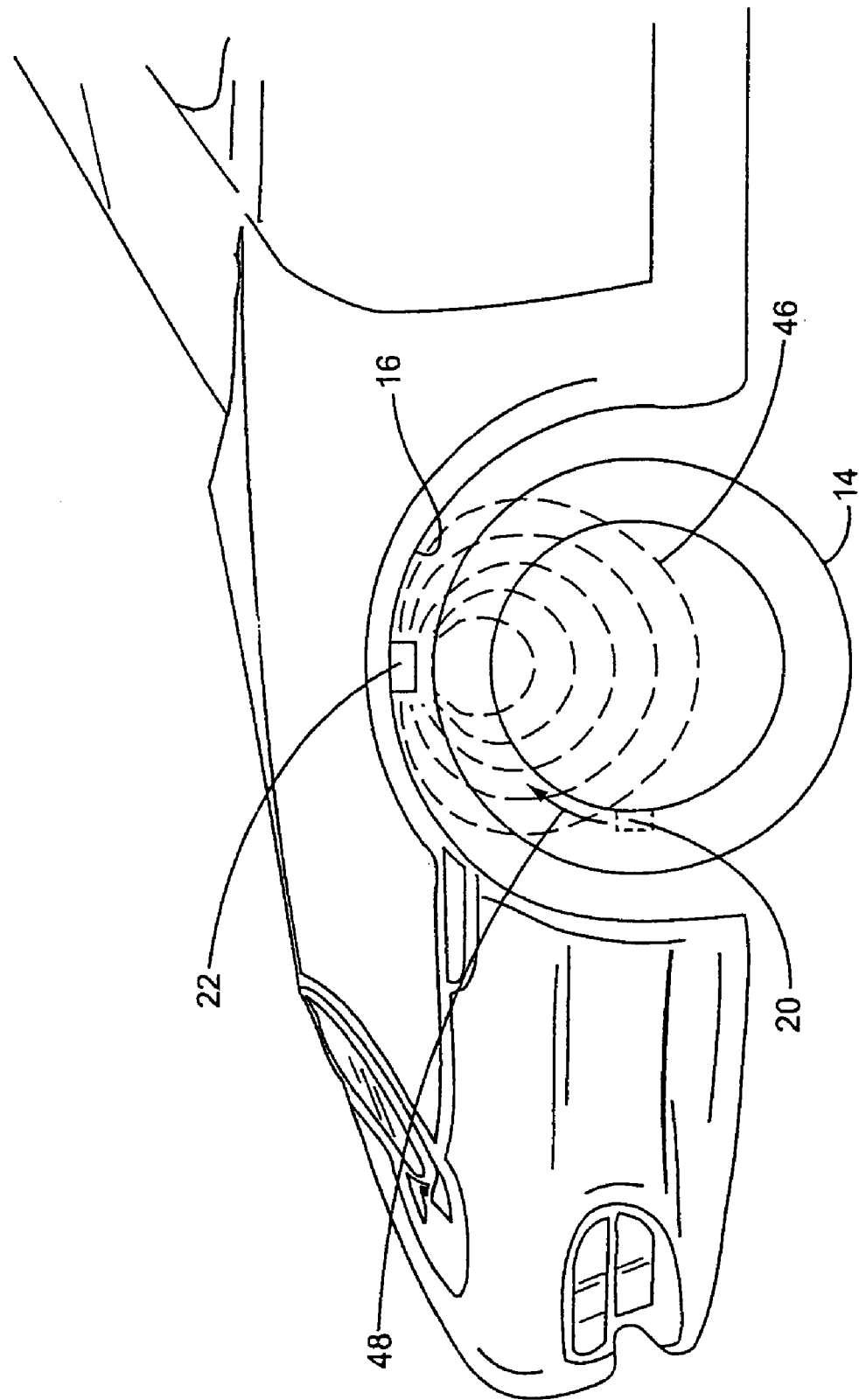
FIG. 4 illustrates an exemplary side elevational view of an interrogator and a transponder interacting in a wheel well.
Figure 7:
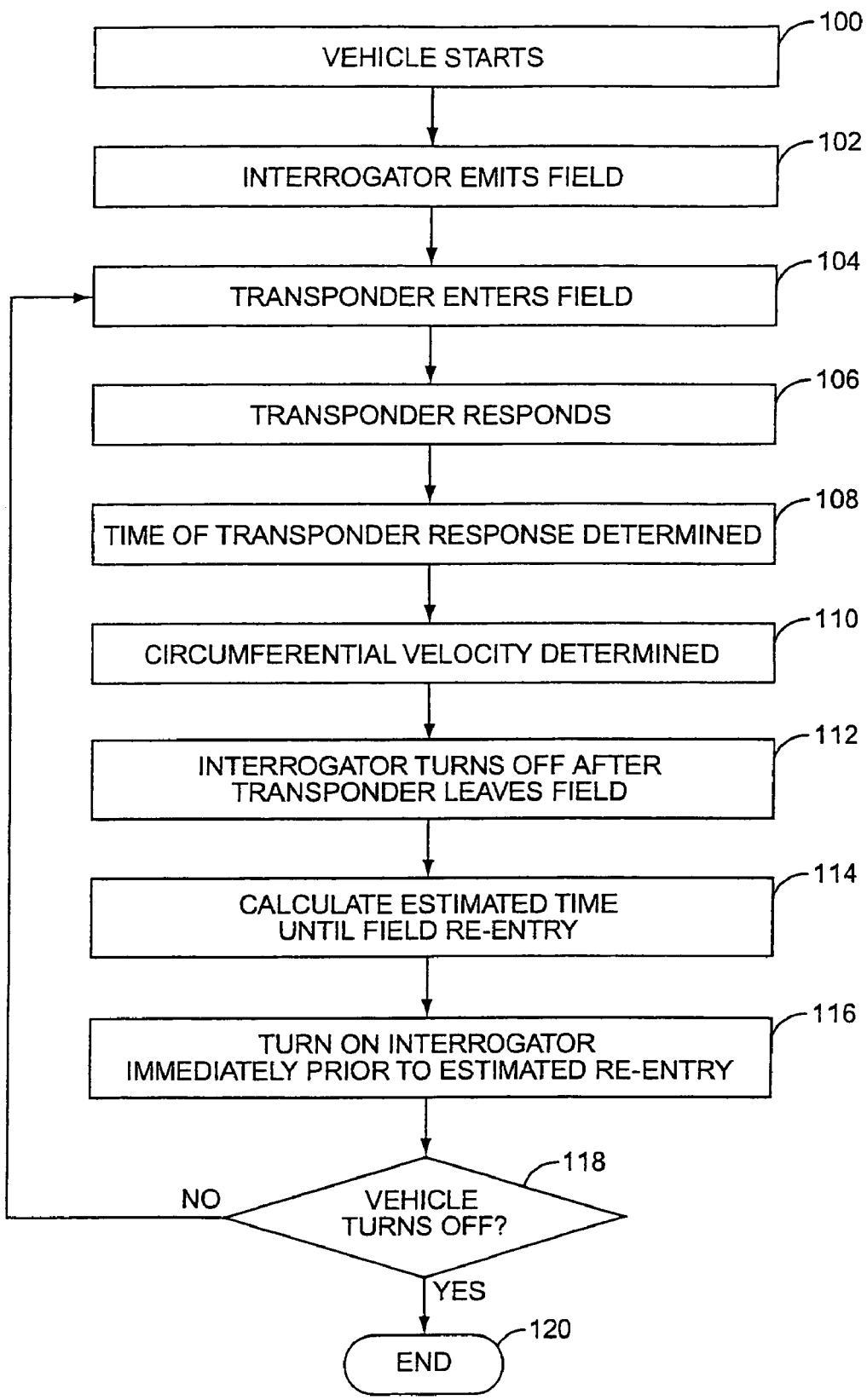
FIG. 7 illustrates as a flow chart a first embodiment of transponder location on the part of the interrogator.
Figure 9:
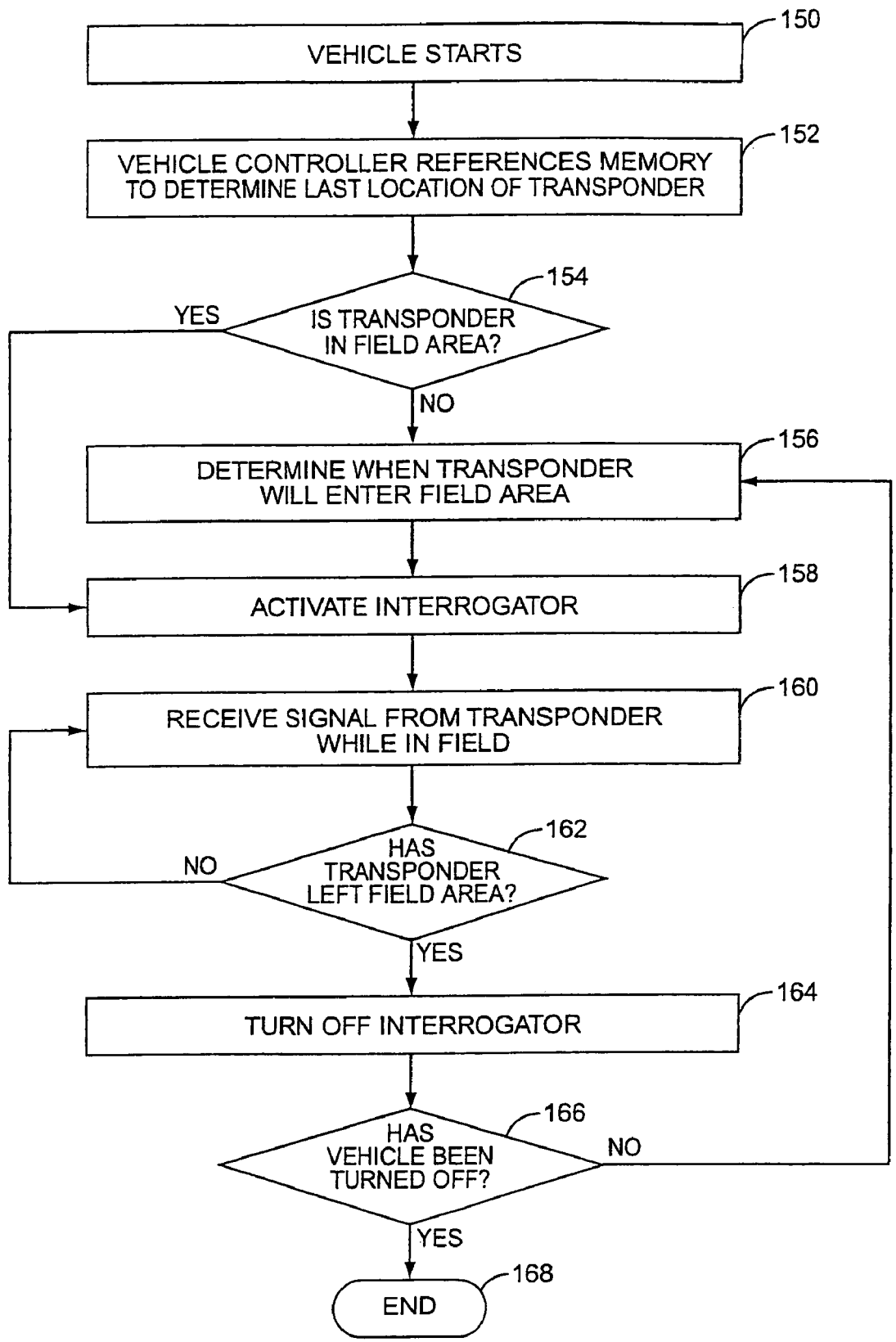
FIG. 9 illustrates as a flow chart a second embodiment of transponder location on the part of the interrogator.

As illustrated in FIG. 4, the interrogator 22 generates an electromagnetic field 46, which in an exemplary embodiment is a lobe-shaped field. The precise frequency of the field 46 is a design choice, but is typically an RF field. It may be desirable to interrogate the transponder 20 when the transponder 20 is within the field 46. Thus, the circumferential position 48 of the transponder 20 must be determined, so that the interrogation may begin proximate in time to the transponder 20 entering the field 46. Two techniques for determining the circumferential position 48 of the transponder 20 are illustrated in FIGS. 7 and 9. From the circumferential position 48, the time window to initiate interrogation of the transponder 20 may be derived.

Armed with the time window in which it may be appropriate to interrogate the transponder 20, modifications may be made to an antenna structure such that focused interrogation occurs. The basic objective is to optimize communication between the interrogator 22 and the transponder 20 such that nearly continuous communication is provided. One way to achieve this is through the use of multiple antennas. If the multiple antennas transmit simultaneously, the radiation pattern of the group may become distorted with interference induced nulls.

Figure 5:
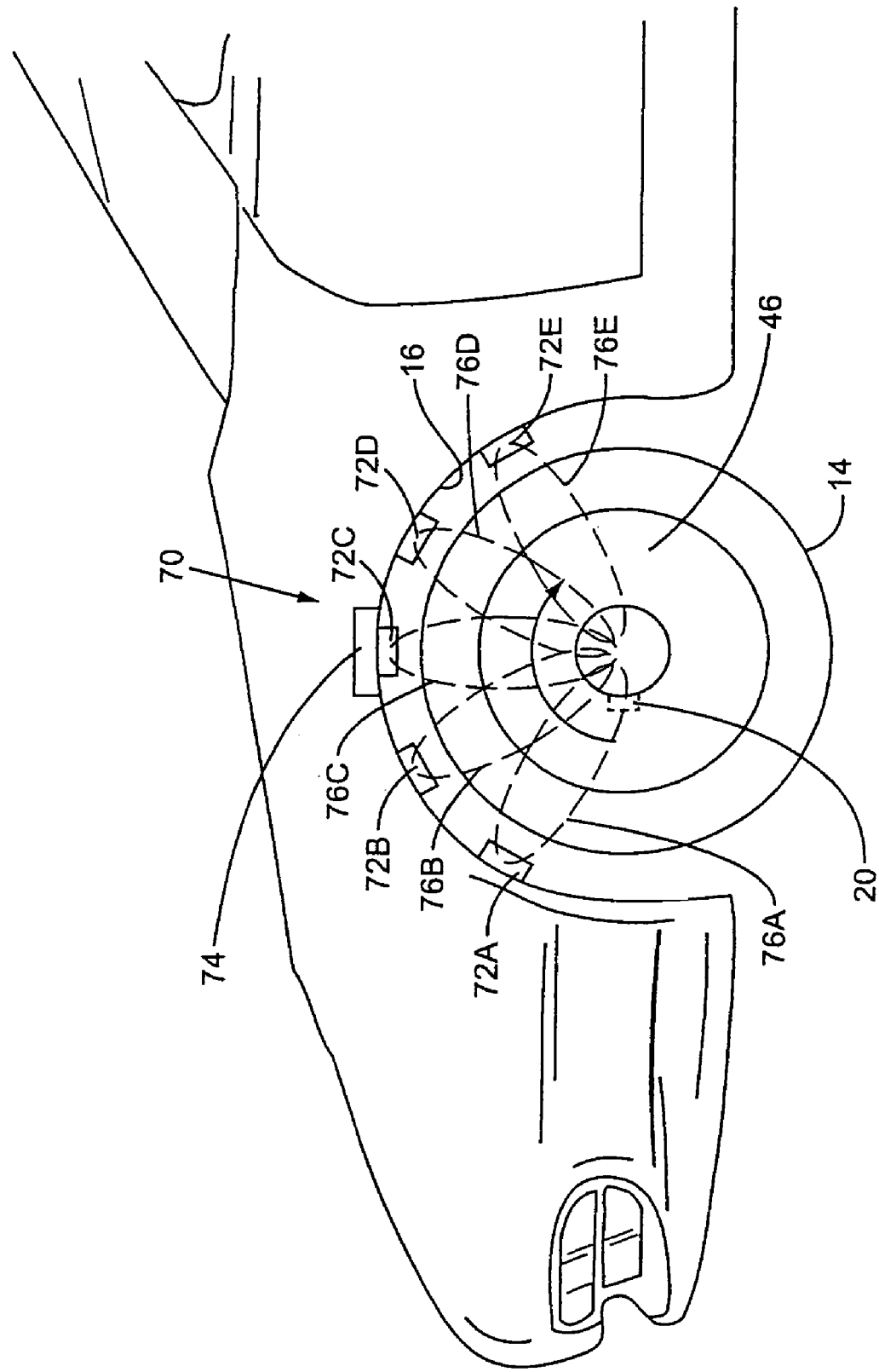
FIG. 5 illustrates a first embodiment of an antenna structure for use with an exemplary embodiment of the present invention.
Figure 6:
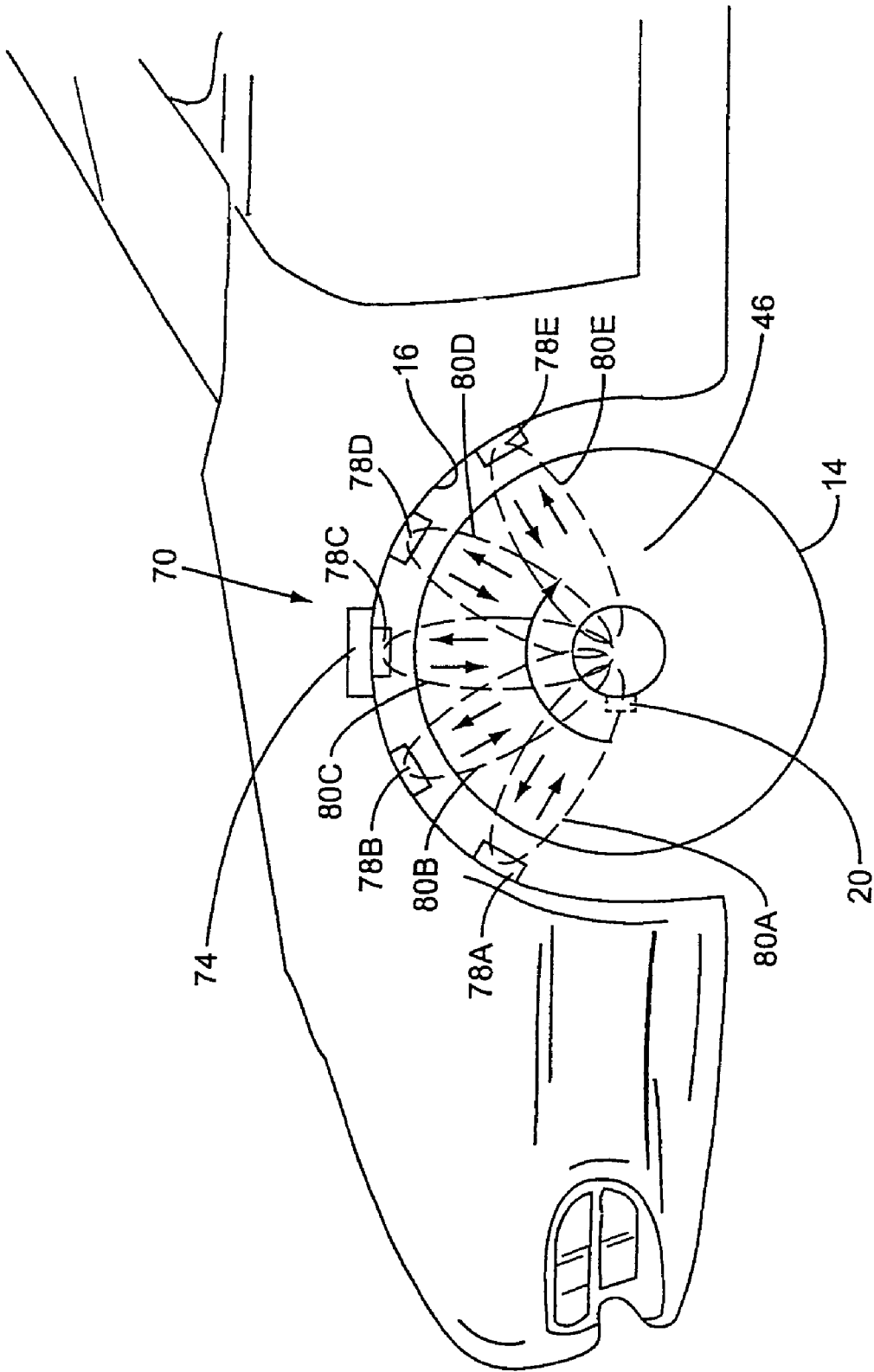
FIG. 6 illustrates a second embodiment of an antenna structure for use with an exemplary embodiment of the present invention.

Since the location and speed of the transponder 20 is known, the antenna need only communicate with the transponder 20 over a narrower arc of rotation of the wheel 14. Further, multiple antennas may be fired sequentially based on the known position and speed, thereby addressing any distortion concerns. Two such antenna structures 70 are illustrated in FIGS. 5 and 6. In the first embodiment of FIG. 5, a plurality of transmit antennas 72 are used in conjunction with a single receive antenna 74. In the embodiment shown, five transmit antennas 72A-72E are illustrated, although it should be appreciated that fewer or more transmit antennas 72 may be used if needed or desired. The transmit antennas 72A-72E generate corresponding electromagnetic lobes 76A-76E. The lobes 76A-76E are narrow and extend sufficiently far to reach the expected location of the transponder 20. The transponder 20 responds with an electromagnetic signal that is received by the receive antenna 74. Because the reflected signal from the transponder 20 will typically have a signal to noise ratio of 20 dB to 50 dB, the lobe structure of the receive antenna 74 need not be as precise as that of the transmits antennas 72.

A second embodiment, illustrated in FIG. 6, of antenna structure 70 arranges a plurality of dual function antennas 78A-78E about the wheel well 16. Each antenna 78 both transmits and receives an electromagnetic signal with a focused lobe 80. As the transponder 20 moves through the field of view of the antennas 78, the antennas may sequentially alter functions to achieve the maximum downlink, transmit, critical path, adequate uplink and receive. For example, initially the first antenna 78A may be in a transmit mode while second antenna 78B was in a receive mode. The remaining antennas 78C-78E may be disconnected. As the transponder 20 moves in front of the second antenna 78B, then the second antenna 78B is used to transmit, while first and third antennas 78A and 78C are used to receive. The remaining antennas 78D and 78E remain disconnected. The transponder 20 may then move into lobe 80C, effectively being in front of third antenna 78C, so third antenna 78C is used to transmit and second and fourth antennas 78B and 78D are used to receive. First and fifth antennas 78A and 78E are disconnected. This process continues until the transponder 20 leaves the lobe 80E, or the last lobe of the antenna structure 70.

FIG. 7 illustrates a first embodiment of transponder 20 location determination. It is possible that the present invention may be carried out while the vehicle 10 is not operating, however it is assumed for the purpose of explanation that the present invention is performed while the vehicle is operating. Thus, the process starts when the vehicle 10 starts (block 100). Initially, before acquisition of the transponder 20 by the interrogator 22, the interrogator 22 emits the electromagnetic field 46 (block 102).

The transponder 20 enters the field 46 as a function of the rotation of the tire 14 (block 104). Alternatively, the transponder 20 may be in the field 46 as soon as the field 46 is activated. In either event, the transponder 20 responds to the interrogation signal (block 106) as is well understood. The interrogator 22 or the vehicle controller 18 may determine the time elapsed during which the transponder 20 responded (block 108). In the event that the transponder 20 started in the field 46, or to reduce the likelihood of a spurious first signal, the determination may wait until the first edge of response is detected after an absence of a response. That is, the determiner (the vehicle controller 18 or the interrogator 22) confirms that there is no response at first, and the interrogator 22 remains active and waits until a response has been detected before beginning to measure the period of time during which there is a response. When an edge is detected indicating that a signal is being received at the interrogator 22, the waiting ends and the measuring begins.

From the time determination and the size of the wheel 14, a circumferential velocity 48 may be determined (block 110). The size of the wheel 14 determines the arc through which the transponder 20 passes. The portion of the arc that is within the field 46 may be divided by the time calculated and the circumferential velocity is determined thereby. Once the absence of a response is detected, the interrogator 22 may be deactivated (block 112). With the circumferential velocity and the size of the wheel 14, the vehicle controller 18 or the interrogator 22 may calculate an estimated time until the transponder 20 re-enters the field 46 (block 114). The portion of the arc that is outside the field 46 is divided by the circumferential velocity 48 to provide the time estimate.

The interrogator 22 may be turned on or reactivated immediately prior to the estimated time of re-entry (block 116). In a preferred embodiment, an absence of a response would be detected and confirmed, and then the transponder 20 would enter the field 46, resulting in a response. This likewise accommodates acceleration and deceleration within reason. It is contemplated that the phrase "immediately prior to the estimated time of re-entry" is to be interpreted as allowing for acceleration at the highest rate possible by the vehicle 10.

A determination is made if the vehicle 10 has been turned off (block 118). If the answer is no, the process repeats. If the answer is yes, the process ends (block 120). Note that the precise order of events need not occur as indicated and that rearrangements of the process are contemplated.

Figure 8:
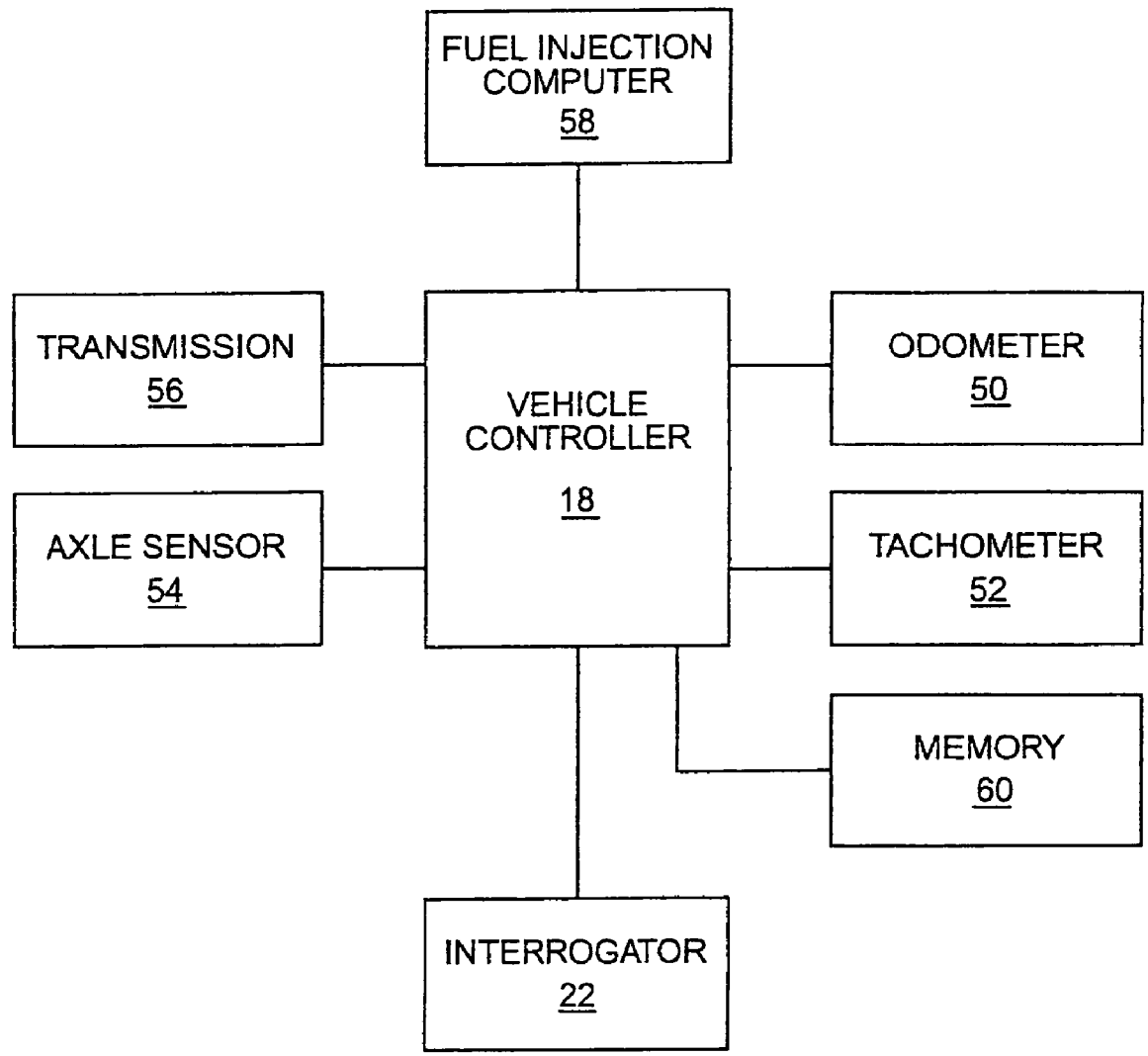
FIG. 8 illustrates a schematic diagram of an interrogator and inputs thereto for the purposes of transponder location.

The second embodiment, described in FIG. 7, may require additional hardware. To explain this additional hardware, reference is made to FIG. 8, in which the vehicle controller 18 is shown schematically connected to a plurality of inputs. Specifically, the vehicle controller 18 is connected to an odometer 50, a tachometer 52, an axle sensor 54, a transmission sensor 56, and/or a fuel injection computer 58 as well as the interrogator 22. From the various inputs, the vehicle controller 18 may determine with some precision the rotation of a wheel 14, and from knowledge already in the possession of the vehicle controller 18, deduce the location and speed of the transponder 20. Note that not all the inputs need be used, and some require more processing than others to derive the rotational speed of the wheels 14. Other sensors or inputs could also be used if needed or desired.

Additionally, a memory 60 may be associated with the vehicle controller 18 in which data may be stored, such as the last location of the transponder 20 prior to the engine being turned off.

With these inputs, the second embodiment of turning on and off the interrogator 22 depending on the location of the transponder 20 may be explicated with reference to FIG. 9. The vehicle 10 starts (block 150) such as when the ignition is turned on. The vehicle controller 18 references the memory 60 to determine the last circumferential location of the transponder 20 (block 152). This may have been determined and entered by factory calibration, by the mechanic who last rotated and/or changed the tires 14, or by storage from the last time the vehicle 10 was operated. Alternatively, this may be determined by empirically, such as through the method of FIG. 7.

The vehicle controller 18 or the interrogator 22 determines if the transponder 20 is within the area of field 46 when the field 46 is active (block 154). If the answer is no, the vehicle controller 18 may reference the inputs such as the axle sensor 54 or the transmission sensor 56 to determine the location of the transponder 20, and determines from its present location and the speed of the vehicle when the transponder 20 will enter the area of the field 46 (block 156). After the determination of block 156, or if block 154 is answered positively, the interrogator 22 is activated (block 158). If the transponder 20 was outside of the area of field 46, then the interrogator 22 is turned on immediately prior to the expected arrival of the transponder 20 within the area of the field 46.

The interrogator 22 receives a response signal from the transponder 20 while the transponder 20 is within the field 46 (block 160). The vehicle controller 18 or the interrogator 22 determines if the transponder 20 has left the field 46 (block 162). If the answer is no, the process repeats. If the answer is yes, then the interrogator 22 is turned off (block 164).

The vehicle controller 18 determines if the vehicle has been turned off (block 166). If the answer is no, the process repeats as indicated. If the answer is yes, the process ends (block 168).

Again, as noted above, the exact order of the method need not be as linear as indicated and variations in the order of the steps are contemplated as well as performing some steps concurrently instead of consecutively.

Figure 10:
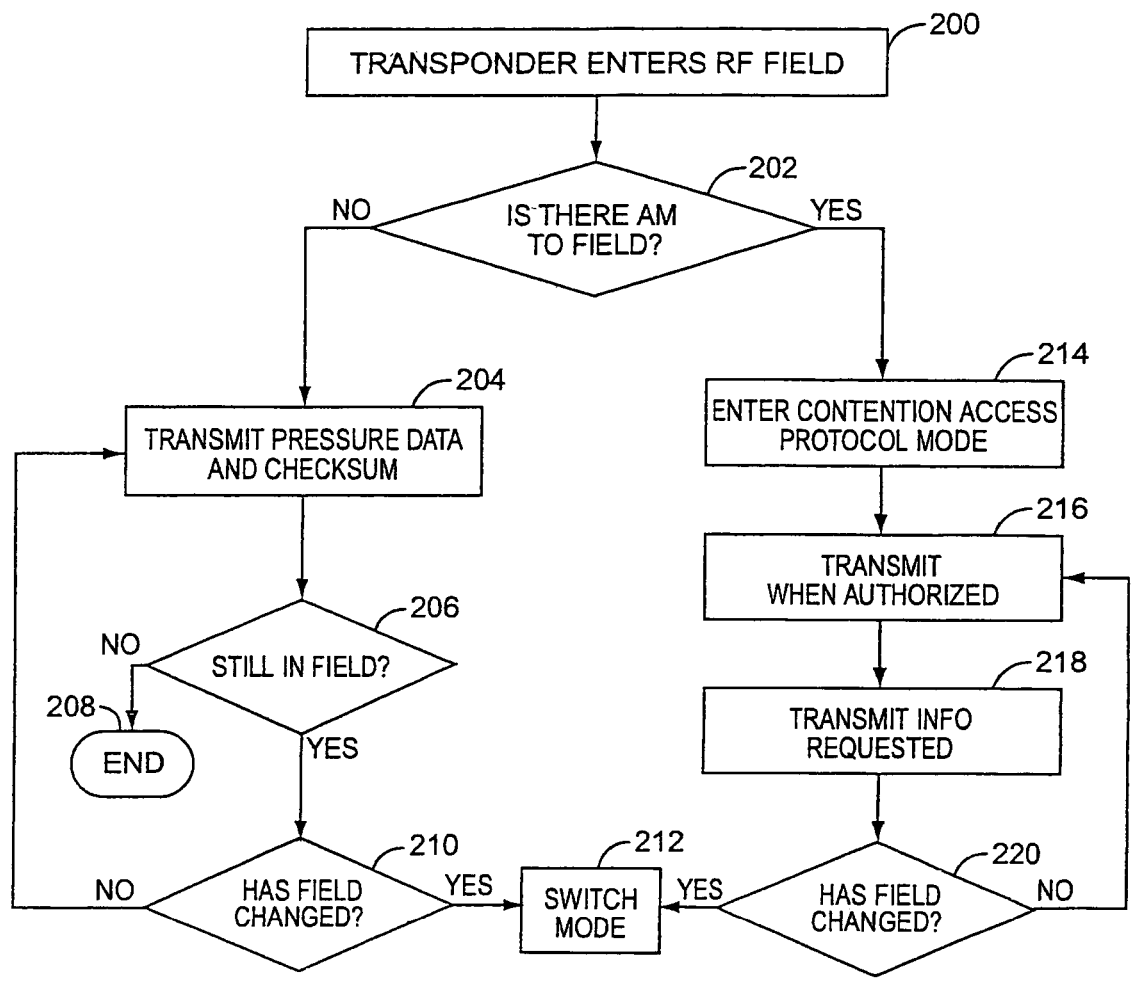
FIG. 10 illustrates as a flow chart an exemplary embodiment of a two-mode functionality configurable for use in embodiments of the present invention.

A third aspect of the present invention relates to how the transponder 20 may have at least a dual mode functionality depending on the type of RF field to which the transponder 20 is subjected. During manufacturing, many transponders 20 and tires 14 may be proximate one another. In such instances, it may be desirable to operate in a first mode such that the transponder 20 responds in a first fashion so that a single interrogation 22 can interrogate a transponder 20, such as during manufacturing of the tire 14. However, this slows down the response time of each transponder 20 since the interrogator 22 must distinguish between different transponders 20. However, when the transponder 20 is installed on a tire 14 that is in operation of a vehicle 10, it may be desirable to operate in a second mode so that the interrogator 22 and the transponder 20 can communicate more quickly since the transponder 20 is no longer competing for bandwidth against other transponders 20 and thus the transponder 20 responds in a second fashion. Other modes could also be incorporated into the transponder 20 as needed or desired. Reference is made to FIG. 10, wherein a flow chart illustrating this dual modality is presented.

Initially, the transponder 20 enters an RF field (block 200). This may be an RF field 46 or a field such as is present in a manufacturing environment. The transponder 20 determines if there is an amplitude modulation (AM) component to the field (block 202). Alternatively, the presence of a known byte will serve the same role, in which case the step becomes the equivalent step of the transponder 20 determining if a known byte is present. If the answer is no, there is no AM component (thus indicating that the transponder is in a field analogous to field 46), the transponder 20 begins to transmit pressure data derived from the tire condition sensor 32 and a checksum with as much speed and bandwidth as is available in a continuous response operation (block 204). The transponder 20 then determines if the transponder 20 is still in the field 46 (block 206). If the answer is no, the process ends (block 208) until the transponder 20 detects a new RF field (block 200). If the answer to block 206 is yes, the transponder 20 determines if the field 46 has changed (block 210). If the answer to block 210 is no, the process repeats as indicated. If the answer to block 210 is yes, then the transponder may switch modes (block 212).

If, however, the determination at block 202 indicates that there is an AM component to the field (or there is a known byte present), then the transponder 20 may enter a contention access protocol mode (block 214). This may include a time division multiplex system, a frequency division multiplex system, or the like as needed or desired. An exemplary contention access protocol is that based on the Carrier Sense Multiple Access (CSMA) protocol commonly used for Ethernet connections.

The transponder 20 transmits information and data when authorized (block 216) and this transmission conveys the information requested by the field that caused the transponder 20 to enter this mode (block 218). The transponder 20 may make a determination that the transponder 20 is still in the field (not shown) and/or a determination that the field has changed (block 220). If the field has changed, the transponder 20 may switch modes (block 212). If however, the field has not changed, the transponder 20 may repeat the process as indicated.

While the above has been termed as a test for the presence of an AM field or a known byte, equivalently, a test for the presence of a continuous RF field, or one modulated by a continuous clock signal could also be used to trigger entry into the mode where the transponder 20 sends data from the tire condition sensor 32 continuously and as quickly as possible. The clock possibility is an interesting variation in that it allows the transponder 20 to use the clock frequency (known to be accurate) as a reference against which the transponder 20 can measure the output of the tire condition sensor 32.

Note that some of the determination steps are not explicit, and the presence or absence of a field may cause the determination. This is especially true when the transponder 20 is a passive device rather than an active device. However, the transponder 20, and particularly the wireless communication circuit 30, may include the intelligence and memory to have complex functionality if needed or desired. Also note that the present invention may include the transfer of information of any kind concerning the tire 14, including pressure, and this information is not limited to pressure information.

Those skilled in the art will recognize improvements and modifications to the preferred embodiments of the present invention. All such improvements and modifications are considered within the scope of the concepts disclosed herein and the claims that follow. It should be noted that that although pressure of the tire 14 is monitored, that other tire conditions in lieu of or in addition to pressure may be monitored using the present invention as well.

What is claimed is:

1. A wireless communication system, comprising:
    a transponder configured to be positioned on a vehicle tire;
    an interrogator; and
    a control system configured to:
        determine a circumferential location of the transponder on the vehicle tire;
        interrogate, through the interrogator, the transponder in a window when the transponder moves in an arc proximate the interrogator; and
        not interrogate the transponder when the transponder is expected to be outside the window.

2. The wireless communication system of claim 1, further comprising:
    a tire condition sensor associated with the transponder and configured to produce a wireless signal indicating a tire condition when interrogated by the interrogator.

3. The wireless communication system of claim 2, wherein the interrogator is adapted to be positioned at least partially in a wheel well.

4. The wireless communication system of claim 2, wherein the tire condition sensor comprises at least one of a pressure sensor, a temperature sensor, a humidity sensor, and a tread sensor.

5. The wireless communication system of claim 2, wherein the control system comprises at least two operating modes, and wherein the control system is communicatively coupled to the tire condition sensor and configured to transmit information from the tire condition sensor to a remote location using one of the at least two operating modes depending on how the remote location interrogates the control system.

6. The wireless communication system of claim 5, wherein a first of the at least two operating modes comprises a contention access protocol.

7. The wireless communication system of claim 5, wherein one of the at least two operating modes comprises a continuous response operation.

8. The wireless communication system of claim 5, wherein one of the at least two operating modes is triggered by an RF field lacking an AM scheme.

9. The wireless communication system of claim 1, wherein the interrogator comprises an antenna, a demodulator, and a baseband processor.

10. The wireless communication system of claim 9, wherein the demodulator is configured to be positioned in a wheel well.

11. The wireless communication system of claim 9, wherein the baseband processor is configured to be positioned in a wheel well.

12. The wireless communication system of claim 9, wherein the demodulator is configured to be positioned remotely from a wheel well.

13. The wireless communication system of claim 9, wherein the baseband processor is configured to be positioned remotely from a wheel well.

14. The wireless communication system of claim 1, wherein the transponder is configured to operate in at least two modes depending on the presence or absence of a predetermined type of electromagnetic field.

15. The wireless communication system of claim 1, wherein the interrogator comprises:
    wireless communication circuitry configured to communicate with the transponder and receive tire condition information therefrom; and
    a plurality of antennas for wirelessly communicating with the transponder, wherein the plurality of antennas are configured to be arranged in an array within a wheel well of the vehicle.

16. The wireless communication system of claim 15, wherein the plurality of antennas comprise a plurality of transmit antennas and a single receive antenna.

17. The wireless communication system of claim 16, wherein the plurality of antennas are configured to be sequentially activated and deactivated as the transponder moves in an arc proximate the plurality of antennas.

18. The wireless communication system of claim 17, wherein antennas not actively transmitting to or receiving from the transponder are deactivated.

19. The wireless communication system of claim 15, wherein the plurality of antennas comprise a plurality of antennas that operate as both transmit antennas and receive antennas.

20. A wireless communication system, comprising:
    a transponder configured to be positioned on a wheel;
    an interrogator; and
    a control system configured to:
        determine a circumferential location of the transponder on the wheel;
        interrogate, through the interrogator, the transponder when the transponder is determined to be within an electromagnetic field of the interrogator; and
        not interrogate the transponder when the transponder is expected to be outside the electromagnetic field of the interrogator.

21. The wireless communication system of claim 20, further comprising:
    a tire condition sensor associated with the transponder and configured to produce a wireless signal indicating a tire condition when interrogated by the interrogator related to a vehicle tire.

22. The wireless communication system of claim 21, wherein the interrogator is configured to be positioned at least partially in a wheel well.

23. The wireless communication system of claim 21, wherein the tire condition sensor comprises at least one of a pressure sensor, a temperature sensor, a humidity sensor, or a tread sensor.

24. The wireless communication system of claim 23, wherein the interrogator comprises:
    wireless communication circuitry configured to communicate with the transponder; and
    a plurality of antennas for wirelessly communicating with the transponder, wherein the plurality of antennas are configured to be arranged in an array around a portion of the wheel.

25. The wireless communication system of claim 24, wherein the plurality of antennas comprise a plurality of transmit antennas and a single receive antenna.

26. The wireless communication system of claim 25, wherein the plurality of antennas are configured to be activated as the transponder moves within the electromagnetic field of the antenna.

27. The wireless communication system of claim 26, wherein antennas not actively transmitting to or receiving from the transponder are deactivated.

28. The wireless communication system of claim 24, wherein the plurality of antennas comprise a plurality of antennas that operate as both transmit antennas and receive antennas.

29. The wireless communication system of claim 21, wherein the control system comprises at least two operating modes, and wherein the control system is communicatively coupled to the tire condition sensor and configured to transmit information from the tire condition sensor to a remote location using one of the at least two operating modes depending on how the remote location interrogates the control system.

30. The wireless communication system of claim 29, wherein a first of the at least two operating modes comprises a contention access protocol.

31. The wireless communication system of claim 29, wherein one of the at least two operating modes comprises a continuous response operation.

32. The wireless communication system of claim 29, wherein one of the at least two operating modes is triggered by an RF field lacking an AM scheme.

33. The wireless communication system of claim 20, wherein the interrogator comprises an antenna, a demodulator, and a baseband processor.

34. The wireless communication system of claim 33, wherein the demodulator is configured to be positioned in the wheel well.

35. The wireless communication system of claim 33, wherein the baseband processor is configured to be positioned in the wheel well.

36. The wireless communication system of claim 33, wherein the demodulator is configured to be positioned remotely from the wheel well.

37. The wireless communication system of claim 33, wherein the baseband processor is configured to be positioned remotely from the wheel well.

38. The wireless communication system of claim 20, wherein the transponder is configured to operate in at least two modes depending on the presence or absence of a predetermined type of electromagnetic field.

39. A method of interrogating a transponder, mounted on a wheel, using an interrogator, comprising:
    determining a circumferential location of the transponder on the wheel;
    interrogating the transponder when the transponder is determined to be within an electromagnetic field of the interrogator; and
    not interrogating the transponder when the transponder is determined to be outside the electromagnetic field of the interrogator.

40. The method of claim 39, wherein the transponder is associated with a sensor.

41. The method of claim 39, wherein the interrogator is configured to be positioned at least partially in a wheel well.

42. The method of claim 39, wherein the interrogator comprises an antenna, a demodulator, and a baseband processor.

43. The method of claim 42, wherein the demodulator is configured to be positioned in the wheel well.

44. The method of claim 42, wherein the baseband processor is configured to be positioned in the wheel well.

45. The method of claim 42, wherein the demodulator is configured to be positioned remotely from the wheel well.

46. The method of claim 42, wherein the baseband processor is configured to be positioned remotely from the wheel well.

47. The method of claim 39, wherein the transponder is configured to operate in at least two modes depending on the presence or absence of a predetermined type of electromagnetic field.

48. The method of claim 39, wherein the control system comprises at least two operating modes, wherein the control system is communicatively coupled to the tire condition sensor and configured to transmit information from the tire condition sensor to a remote location using one of the at least two operating modes depending on how the remote location interrogates the control system.

49. The method of claim 48, wherein a first of the at least two operating modes comprises a contention access protocol.

50. The method of claim 49, wherein the interrogator comprises:
    wireless communication circuitry configured to communicate with the transponder; and
    a plurality of antennas for wirelessly communicating with the transponder, wherein the plurality of antennas are configured to be arranged in an array around a portion of the wheel for wirelessly communicating with the transponder.

51. The method of claim 50, wherein the plurality of antennas comprise a plurality of transmit antennas and a single receive antenna.

52. The method of claim 51, wherein the plurality of antennas comprise a plurality of antennas that operate as both transmit antennas and receive antennas.

53. The method of claim 52, wherein each antenna of the plurality of antennas is configured to be activated as the transponder moves within the electromagnetic field of the antenna.

54. The method of claim 53, wherein antennas not actively transmitting to or receiving from the transponder are deactivated.

55. The method of claim 51, further comprising sequentially using antennas from the plurality of antennas to communicate with the transponder.

56. The method of claim 55, further comprising sequentially transmitting with, receiving with, and deactivating antennas from the plurality of antennas.

57. The method of claim 48, wherein one of the at least two operating modes comprises a continuous response operation.

58. The method of claim 48, wherein one of the at least two operating modes is triggered by an RF field lacking an AM scheme.

* * * * *